United States Patent Office 3,338,920
Patented Aug. 29, 1967

3,338,920
METHOD FOR THE PREPARATION OF
4-HYDROXY-2-SULFOLENE
Walter Dittmann, Marl, Germany, assignor to Chemische
Werke Huls Aktiengesellschaft, Marl, Germany, a corporation of Germany
No Drawing. Filed Aug. 15, 1966, Ser. No. 572,196
Claims priority, application Germany, Aug. 11, 1964,
C 33,608; Oct. 16, 1965, C 37,183
6 Claims. (Cl. 260—332.1)

This application is a continuation-in-part of my application Ser. No. 472,042, filed July 14, 1965, now abandoned.

It is known that 4-hydroxy-2-sulfolene can be made by splitting hydrogen halide from 3-halogen-4-hydroxysulfolane by means of an excess of sodium acetate in glacial acetic acid or by means of silver salts such as silver carbonate or silver acetate or by treatment with a large excess of liquid ammonia. It is also known to rearrange 3,4-epoxy-sulfolane into 4-hydroxy-2-sulfolene. The reaction has been carried out heretofore either in liquid ammonia or by heating in an aqueous barium carbonate suspension with careful maintainence of the pH value at 8.8, the weight ratio of the epoxide to barium carbonate being 1.4 to 1. In this manner, up to the present, 4-hydroxy-2-sulfolene has been isolated only by paper chromatography.

It has now been found that 4-hydroxy-2-sulfolene can be made by the rearrangement of 3,4-epoxy-sulfolane by heating the 3,4-epoxysulfolane with a catalytic amount of the anhydrous halides (chloride, bromide, iodide or fluoride) of the metals of Group Ia (Li, Na, K, Rb and Cs) and Group IIa (Be, Mg, Ca, Sr and Ba) of the periodic system of Mendeleef or such above characterized halides which contain less than the maximum of water of crystallization to a temperature above 90° C. This result is surprising because epoxides under the influence of salts of magnesium generally isomerize to high yields of ketones (see German Patent No. 1,075,601).

The reaction is carried out by heating the crystallized, catalyst-containing 3,4-epoxy-sulfolane whereby in a few minutes the reaction product forms a clear yellowish brown oil. The preferred temperature range is from 90 to 200° C. An addition of solvent is unnecessary. If the reaction is to be carried out in the presence of a solvent, hydrocarbons such as benzine, isopropylcyclohexane, toluene and xylene, ethers such as dioxane and dibutylether or esters such as isopropylacetate and butylacetate are suitable. When using a hydrocarbon solvent the 4-hydroxy-2-sulfolene formed separates as an insoluble liquid phase and can be isolated by a simple separation of the phases. Suitable catalysts for the reaction are anhydrous iodide and/or bromide of magnesium, lithium chloride, sodium chloride, sodium bromide, potassium chloride, potassium iodide, magnesium chloride, calcium chloride, $CaCl_2 \cdot 2H_2O$ or calcium bromide. It is advantageous to supply them in the form of their readily available etherates. From 1 to 2% by weight of catalyst generally is sufficient to give a complete cinversion. The necessary reaction time generally is a few minutes. The process can be carried out very simply by direct distillation of the starting material mixed with the catalyst. The isomerization is completed during the heating involved in the distillation, i.e. usually less than 15 minutes with yields often in excess of 80%.

The crude product can be used for many purposes without purification, for example for the production of esters and in the manufacture of textiles. The crude product may however be purified by distillation.

The 4-hydroxy-2-sulfolene is a valuable starting material for a variety of organic syntheses. It can be copolymerized with polymerizable unsaturated monomers or used for the production of esters which are useful as softening agents, lubricants, antistatic agents and copolymerization and cross-linking components. Moreover it can be used as starting material for insecticides e.g. for the production of urethanes which are useful as parasiticides (U.S. Patent No. 3,075,995).

Example 1

A mixture of 100 parts by weight of 3,4-epoxy-sulfolane and 2 parts by weight of magnesium iodide etherate is charged into a distillation vessel. During the heating up to 90° C. the mixture begins to melt and becomes completely liquid at about 120° C. By distillation 91 parts by weight of 4-hydroxy-2-sulfolene is recovered as a yellowish-brown oil. B.P.$_{0.5}$: 165–167° C., $n_D^{20}$: 1.5242.

Analysis gives following values (formula $C_4H_6O_3S$):
Calculated: C, 35.83; H, 4.51; O, 35.80; S, 23.86; iodine No., 189; mol. wt., 134.1; hydroxyl number, 418. Found: C, 35.90; H, 4.50; O, 35.50; S, 23.90; iodine No., 183; mol wt., 138.0; hydroxyl number, 409.

Example 2

100 parts by weight of 3,4-epoxy-sulfolane and 2 parts by weight of magnesium bromide were mixed and charged into a distillation vessel. The mixture was completely molten at 150° C. It was distilled under reduced pressure yielding 89 parts by weight of 4-hydroxy-2-sulfolene as a yellowish-brown oil. B.P.$_{0.2}$: 156–159° C., $n_D^{20}$: 1.5239.

Formula $C_4H_6O_3S$: Calculated: C, 35.83; H, 4.51; O, 35.80. Found: C, 36.10; H, 4.50; O, 35.80.

Redistillation of the already analytically pure crude products of Examples 1 and 2 gave 4-hydroxy-2-sulfolene as a clear slightly yellowish oil.

Example 3

A mixture of 50 parts by weight of 3,4-epoxy-sulfolane and 1 part by weight of magnesium iodide etherate was stirred for 5 minutes at 90° C. The resulting 4-hydroxy-2-sulfolene was a yellowish brown oil, $n_D^{20}$: 1.5248, hydroxyl number 400.

Example 4

100 parts by weight of 3,4-epoxy-sulfolane and 1 part by weight of magnesium iodide etherate were heated at 120° C. for 5 minutes with stirring. By distillation of the crude product 92 parts by weight of 4-hydroxy-2-sulfolene were recovered. B.P.$_{0.3}$: 157–160° C., $n_D^{20}$: 1.5241, hydroxyl number 429.

Example 5

5 minutes heating of 50 parts by weight of 3,4-epoxy-sulfolane and 1 part by weight of magnesium iodide etherate at 100° C. gave 46 parts by weight of 4-hydroxy-2-sulfolene. Distillation gave 41 parts by weight. B.P.$_{0.3}$: 154–156° C., $n_D^{20}$: 1.5248, OH-number 414, yield 92%.

Example 6

Example 5 was carried out at 90° C. and gave 45 parts by weight of the 4-hydroxy-2-sulfolene. OH-number 414, yield 90%.

Example 7

A mixture of 50 parts by weight of 3,4-epoxysulpholane and 1 part by weight of lithium chloride was heated in a distilling flask. At 90° C. the mixture began to melt and reached a liquid state at approximately 100° C.

42 parts by weight (84%) of 4-hydroxy-2-sulpholene, B.P.$_{0.5}$: 165 to 166° C., $n_D^{20}$: 1.5235, distilled as a slightly yellowish oil.

Analysis shows following values (formula $C_4H_6O_3S$):

Calculated: C, 35.83; H, 4.51; O, 35.80; S, 23.86; iodine No., 189; mol. wt., 134.1; hydroxyl number 418. Found: C, 35.82; H, 4.65; O, 36.09; S, 23.90; iodine No., 182; mol wt., 139; hydroxyl number 408.

*Example 8*

A mixture of 100 parts by weight of 3,4-epoxysulpholane and 3 parts by weight of lithium chloride was heated in a stirrer vessel. At approximately 100° C. the mixture began to melt. The temperature rose to 170° C. without additional heating. After approximately 5 minutes the reaction was completed. The reaction product was dissolved in 400 parts by weight of water and the solution was filtered first through a cation and then through an anion exchanger. The water was then removed under vacuum, finally at 0.5 Torr and 100° C. sump temperature. There remained 83 parts by weight of 4-hydroxy-2-sulpholene, $n_D^{20}$; 1.5260, hydroxyl number, 404, in the form of water-clear oil.

*Example 9*

A mixture of 50 parts by weight of 3,4-epoxysulpholane and 1 part by weight of sodium bromide was heated. Instantaneous reaction took place at approximately 120° C., with the temperature rising up to 190° C. The substance was cooled, dissolved in 200 parts by weight of water and further processed as in Example 8. There remained 37 parts by weight (74%) of 4-hydroxy-2-sulpholene, $n_D^{20}$: 1.5265, in the form of almost water-clear oil.

Analysis showed following values (formula $C_4H_6O_3S$): Calculated: C, 35.83; H, 4.51; O, 35.80; S, 23.86; iodine No., 189; mol. wt., 134.1; hydroxyl number, 418. Found: C, 35.50; H, 4.75; O, 35.94; S, 23.70; iodine No., 182; mol. wt., 140; hydroxyl number, 407.

*Example 10*

The process was carried out as stated in Example 9 but by use of 1 part by weight of potassium iodide in place of sodium bromide. The yield was 35.5 parts by weight (71%) of 4-hydroxy-2-sulpholene, $n_D^{20}$: 1.5258, hydroxyl number, 408.

*Example 11*

100 parts by weight of 3,4-epoxysulpholane was heated together with 2 parts by weight of anhydrous magnesium chloride. The reaction began at 130° C., with the temperature rising up to 160° C. The substance was stirred for 15 minutes at 140° C. and then cooled off, dissolved in methanol and filtered. The methanol was removed under vacuum, finally at 0.5 Torr and 100° C. sump temperature. There remained 51 parts by weight of 4-hydroxy-2-sulpholene, $n_D^{20}$: 1.5239, hydroxyl number, 405.

*Example 12*

100 parts by weight of 3,4-epoxysulpholane and 2 parts by weight of $CaCl_2 \cdot 2H_2O$ were heated together. The exothermic reaction began at 130° C., with the temperature rising up to 160° C. After 5 minutes the mixture was cooled and distilled. 81 parts by weight of 4-hydroxy-2-sulpholene, $n_D^{20}$: 1.5240, B.P.$_{0.5}$: 164 to 168° C., hydroxyl number 406, was obtained in the form of a yellow oil.

I claim:
1. Process for the production of 4-hydroxy-2-sulfolene which comprises heating 3,4-epoxy-sulfolane to a temperature of at least 90° C. in the presence of a catalytic amount of a catalyst compound selected from the group consisting of the anhydrous halides and halides containing less than the maximum content of water of crystallization of the elements of Group Ia and IIa of the Periodic System of Mendeleeff.
2. Process as defined in claim 1 in which the catalytic compound is introduced into the reaction mixture in the form of its etherate.
3. Process as defined in claim 1 in which the catalytic compound amounts to from 1 to 2% by weight of the weight of the 3,4-epoxy-sulfolane.
4. Process as defined in claim 1 in which the heating is carried out at a temperature within the range from 90 to 200° C.
5. Process as defined in claim 1 in which the heating is carried out in the presence of an inert solvent.
6. Process as defined in claim 1 in which the catalytic compound is a halide selected from the group consisting of the bromides and iodides of a metal selected from the group consisting of Li, Na, K, Rb, Cs, Be, Mg, Ca, Sr and Ba.

References Cited

UNITED STATES PATENTS 2,610,192  9/1962  Mahan et al. _____ 260—332.1

WALTER A. MODANCE, *Primary Examiner.*

C. M. SHURKO, *Assistant Examiner.*